US009410747B2

(12) United States Patent
Kim

(10) Patent No.: US 9,410,747 B2
(45) Date of Patent: Aug. 9, 2016

(54) POROUS MATERIAL HAVING MICROPORES CAPABLE OF STORING AND RELEASING HEAT BY PHASE CHANGE AND PREPARATION METHOD THEREOF

(71) Applicant: KOREA INSTITUTE OF CONSTRUCTION TECHNOLOGY, Gyeonggi-do (KR)

(72) Inventor: Kwang-Soo Kim, Gyeonggi-do (KR)

(73) Assignee: KOREA INSTITUTE OF CONSTRUCTION TECHNOLOGY, Gyeonggi-do (KR)

( * ) Notice: Subject to any disclaimer, the term of this patent is extended or adjusted under 35 U.S.C. 154(b) by 639 days.

(21) Appl. No.: 13/706,534

(22) Filed: Dec. 6, 2012

(65) Prior Publication Data

US 2013/0139995 A1 Jun. 6, 2013

(30) Foreign Application Priority Data

Dec. 6, 2011 (KR) ........................ 10-2011-0129819
Nov. 29, 2012 (KR) ........................ 10-2012-0137272

(51) Int. Cl.
*F28D 17/00* (2006.01)
*B05D 5/00* (2006.01)
*C09K 5/06* (2006.01)
*F28D 20/02* (2006.01)

(52) U.S. Cl.
CPC *F28D 17/00* (2013.01); *B05D 5/00* (2013.01); *C09K 5/063* (2013.01); *F28D 20/023* (2013.01); *Y02E 60/145* (2013.01)

(58) Field of Classification Search
None
See application file for complete search history.

(56) References Cited

U.S. PATENT DOCUMENTS 6,200,681 B1* 3/2001 Jahns et al. .............. 428/402.24
2013/0134347 A1* 5/2013 Edgar et al. ..................... 252/62
2013/0298991 A1* 11/2013 Parker et al. .................. 136/259

FOREIGN PATENT DOCUMENTS

KR          20-0350129 Y1    5/2004
KR     10-2007-0029311 A     3/2007
KR          10-1194147 B1   10/2012

* cited by examiner

*Primary Examiner* — Necholus Ogden, Jr.
(74) *Attorney, Agent, or Firm* — IP Legal Services, LLC

(57) ABSTRACT

The present invention provides a porous material having micropores capable of storing and releasing heat by phase change, which comprises a phase change material inserted into the micropores of a porous material medium such as activated carbon or silica gel so as to be capable of storing and releasing energy, and a preparation method thereof. The method comprises the steps of: pre-treating a porous material medium to remove impurities from the micropores of the porous material medium, thereby opening the micropores; pre-treating a phase change material to make it possible to insert the phase change material into the micropores of the porous material medium; inserting the pretreated phase change material into the pretreated porous material medium; filtering the porous material medium filled with the phase change material to remove the phase change material remaining after the insertion step; and washing the filtered material.

15 Claims, 6 Drawing Sheets

POROUS MATERIAL HAVING MICROPORES CAPABLE OF STORING AND RELEASING HEAT BY PHASE CHANGE AND PREPARATION METHOD THEREOF

CROSS REFERENCE TO PRIOR APPLICATIONS

The present application claims priority under 35 U.S.C. §119 to Korean Patent Application Nos. 10-2011-0129819 (filed on Dec. 6, 2011) and 10-2012-0137272 (filed on Nov. 29, 2012), which are all hereby incorporated by reference in their entirety.

BACKGROUND OF THE INVENTION

1. Field of the Invention

The present invention relates to a porous material having micropores capable of storing and releasing heat by phase change and a preparation method thereof. More particularly, the present invention relates to a porous material having micropores capable of storing and releasing heat by phase change, which comprises a phase change material inserted into the micropores of a porous material medium, such as activated carbon or silica gel, and a preparation method thereof.

2. Description of the Prior Art

In recent years, due to concerns over the exhaustion of fossil fuels, new sources of alternative energy have been increasingly required. However, an energy source superior to petroleum in characteristics is practically impossible. In an attempt to overcome this limitation, the development of new energy storage media that store or release energy in response to change in ambient temperature is significantly needed.

In recent years, great interest has been paid to materials utilizing the latent heat of phase change materials (PCMs), which absorb and store heat in response to a rise in ambient temperature and release heat when the ambient temperature is lowered.

Typical examples of such phase change materials include paraffin waxes such as polyethylene glycol, fatty acids such as caprylic acid, inorganic salts such as hydrated inorganic salt, and so on.

Such phase change materials undergo a solid-to-liquid phase to absorb surrounding heat when the ambient temperature is higher than the melting temperature of the phase change materials, but undergo a liquid-to-solid phase change to release heat when the ambient temperature is lower than the melting temperature of the phase change materials.

FIG. 1 schematically shows paraffin wax, a conventional phase change material, encapsulated with a thin polymer film.

A method which is currently commonly used with phase change materials in practical use is a capsulation method in which the phase change material is dispersed into a liquid medium and a polymer material corresponding to the dispersed phase change material is introduced so that the phase change material is encapsulated in the polymer material.

A solvent that is used to disperse the phase change material is water, a mixture of water and methanol, or methanol.

Examples of the synthetic polymer material that is used for encapsulation include polyethylene, polypropylene, polystyrene, urea resin, polyvinyl acetate and so on.

Methods for encapsulation include physical methods such as spray drying or centrifugal force-based methods, and chemical methods such as coacervation or interfacial polymerization.

However, the method of encapsulating the phase change material using the polymer has problems in that volatile materials such as the solvent used to dissolve the polymer can cause environmental pollution problems, the method requires a very complex process and is very costly, and leaks can take place when the phase change material expands its volume in the transition from liquid to solid.

For example, when the expansion and shrinkage of the phase change material shown in FIG. 1 is repeated during its phase change, the shrinkage of the polymer material is also repeated accordingly, and the polymer material in the form of a thin film is cracked or torn when it is used for an extended period of time, resulting in the leakage of the phase change material.

In addition, because the polymer material has low heat conductivity, the functions of heat absorption and release that characterize the original phase change material are not sufficiently made use of.

Specifically, the phase change material encapsulated with the polymer according to the above-described method has low resistance to external friction or pressure, and thus is generally used in a state where it is held in a metal container having high heat conductivity.

However, in the case in which the phase change material is used in a state where it is filled in the metal container, it is difficult to construct the metal container in a micrometer size, and therefore the phase change material in the metal container has low heat transfer efficiency because the area of contact with the surrounding environment is minimal. In addition, the phase change material filled in the metal container is heavy in weight, and thus can be used only in limited applications (e.g., boilers).

SUMMARY OF THE INVENTION

Accordingly, the present invention has been made in view of the problems occurring in the prior art, and it is an object of the present invention to provide a new conceptual material containing a phase change material, which can be prepared in an environmentally-friendly manner without the use of volatile materials and can be prepared in a simple and cost-effective manner without requiring an encapsulation process, and a preparation method thereof.

Another object of the present invention is to provide a new conceptual material containing a phase change material, in which the functions of heat absorption and release that characterize the phase change material can be more efficiently made use of and wherein the phase change material does not leak even under application of external pressure or friction, and a preparation method thereof.

The objects of the present invention are not limited to those mentioned above, and other objects of the present invention can be clearly understood from the following description.

In order to achieve the above objects and other objects, in accordance with a first aspect of the present invention, there is provided a method for preparing a porous material having micropores capable of storing and releasing heat by phase change, the method comprising the steps of: pre-treating a porous material medium to remove impurities from the micropores of the porous material medium to thereby open the micropores; pre-treating a phase change material to make it possible to insert the phase change material into the micropores of the porous material medium; inserting the pre-treated phase change material into the pretreated porous material medium; filtering the porous material medium filled with the phase change material to remove the phase change material remaining after the insertion step; and washing the filtered material.

In the first aspect of the present invention, the porous material medium may be activated carbon or silica gel, and the phase change material includes any one selected from among caprylic acid ($CH_3(CH_2)_6COOH$), Glauber's salt, manganese nitrate hexahydrate ($Mn(NO_3)_2.6H_2O$), manganese nitrate tetrahydrate ($Mn(NO_3)_2.4H_2O$), and zinc nitrate hexahydrate ($Zn_2(NO_3)_2.6H_2O$), but is not limited thereto.

In the first aspect of the present invention, the step of pre-treating the porous material medium comprises drying and vacuum-treating the porous material medium. For example, this step may comprise heating the porous material medium to 200° C., and then applying a vacuum thereto (below 1 atm).

In the first aspect of the present invention, the step of pre-treating the phase change material comprises reducing the viscosity of the phase change material by heating the phase change material to a temperature equal to or higher than the melting point thereof.

In the first aspect of the present invention, the insertion step may comprise mixing the pretreated phase change material with the pretreated porous material medium and aging the mixture at a temperature equal to or higher than the melting point of the phase change material for a predetermined time.

In the first aspect of the present invention, the insertion step may further comprise treating the mixture so as to diffuse the phase change material into the micropores of the porous material medium. This diffusion of the phase change material may be performed by maintaining the mixture in a pressure tank at a pressure equal to or higher than 1 atm for 24 hours.

In the first aspect of the present invention, the washing step may be performed by washing the phase change material with hot water having a temperature equal to or higher than the melting point of the phase change material.

In accordance with a second aspect of the present invention, there is provided a porous material having micropores capable of storing and releasing heat by phase change, the porous material comprising: a porous material medium comprising activated carbon or silica gel; and a phase change material filled in the porous material medium, wherein the porous material medium before being filled with the phase change material is a porous material medium subjected to drying and vacuum treatment to remove impurities from the micropores thereof, and the phase change material is obtained by heating to a temperature equal to or higher than the melting point thereof.

In the second aspect of the present invention, the porous material medium is preferably a porous material medium obtained by heating a porous material medium to 200° C. and then applying a vacuum thereto.

In the second aspect of the present invention, the phase change material may include any one of caprylic acid ($CH_3(CH_2)_6COOH$), Glauber's salt, manganese nitrate hexahydrate ($Mn(NO_3)_2.6H_2O$), manganese nitrate tetrahydrate ($Mn(NO_3)_2.4H_2O$), zinc nitrate hexahydrate ($Zn_2(NO_3)_2.6H_2O$) and other phase change materials.

In the second aspect of the present invention, the porous material having micropores capable of storing and releasing heat by phase change may be obtained by mixing the heated phase change material with the porous material medium, aging the mixture at a temperature equal to or higher than the melting point of the phase change material for a predetermined time, maintaining the aged mixture at a pressure of 1 atm or higher for a predetermined time, filtering the mixture so as to remove the phase change material remaining after insertion, and washing the filtered material with hot water having a temperature equal to or higher than the melting point of the phase change material.

DETAILED DESCRIPTION OF THE INVENTION

Figure 1:
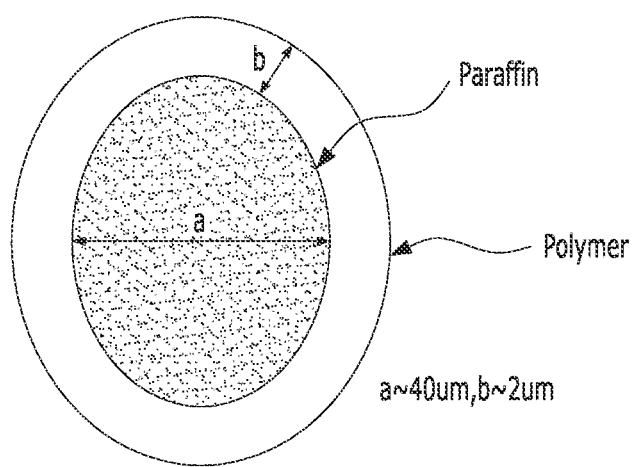
FIG. 1 schematically shows paraffin wax, a conventional phase change material, encapsulated with a thin polymer film.

Additional objects, features and advantages of the present invention will be more clearly understood from the following detailed description and the accompanying drawings.

Although the present invention can be modified variously and have several embodiments, exemplary embodiments are illustrated in the accompanying drawings and will be described in detail in the detailed description. However, the present invention is not limited to the specific embodiments and should be construed as including all of the changes, equivalents and substitutions included in the spirit and scope of the present invention.

Terms used in this specification are used only to describe a specific embodiment and are not intended to limit the scope of the present invention. Singular expressions include plural expressions unless specified otherwise in the context thereof. In this specification, the terms "comprise", "have", etc., are intended to denote the existence of mentioned characteristics, numbers, steps, operations, components, parts, or combinations thereof, but do not exclude the probability of existence or addition of one or more other characteristics, numbers, steps, operations, components, parts, or combinations thereof.

In the following description with reference to the accompanying drawings, like components are denoted by like reference numerals, and the descriptions of the components will not be repeated. In the following description, the detailed description of related known technology will be omitted when it may obscure the subject matter of the present invention.

Hereinafter, a porous material having micropores capable of storing and releasing heat by phase change and a preparation method thereof according to preferred embodiments of the present invention will be described in detail with reference to the accompanying drawings. In the following description, the expression "porous material medium" refers to a raw porous material medium before being filled with a phase change material.

Figure 2:
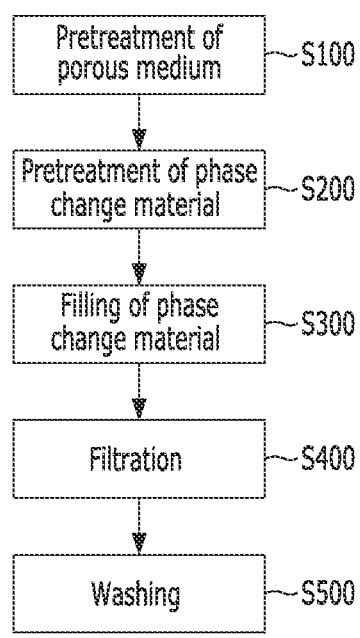
FIG. 2 is a flow chart showing a method for preparing a porous material capable of storing and releasing heat by phase change according to the present invention.

First, the method for preparing the porous material having micropores capable of storing and releasing heat by phase change according to the present invention will be described with reference to FIG. 2. FIG. 2 is a flow chart showing the method for preparing the porous material having micropores capable of storing and releasing heat by phase change according to the present invention.

As shown in FIG. 2, the method for preparing the porous material having micropores capable of storing and releasing heat by phase change comprises the steps of: (S100) pre-treating a porous material medium to remove impurities from the micropores of the porous material medium, thereby opening the micropores; (S200) pre-treating a phase change material to make it possible to insert the phase change material into the micropores of the porous material medium; (S300) inserting the pretreated phase change material into the pretreated porous material medium; (S400) filtering the porous material medium filled with the phase change material to remove the phase change material remaining after the insertion step; and (S500) washing the filtered material.

The porous material medium that is used in the present invention may be activated carbon or silica gel. Hereinafter, the description will be made using the example of activated carbon as the porous material medium.

Generally, the micropores of activated carbon exposed to air contain moisture or air. Such air or moisture contained in the micropores of activated carbon interferes with the insertion of the phase change material into the micropores. For this reason, activated carbon is subjected to a pretreatment process for removing impurities from the micropores of activated carbon to thereby open the micropores.

Step (S100) of pre-treating the porous material medium comprises a drying and vacuum treatment. Specifically, in the step pre-treating the porous material medium, the porous material medium is heated to about 200° C. using a dryer or the like, and then a vacuum is applied thereto, thereby removing impurities from the micropores of the porous material medium.

Examples of the phase transition material that is used in the present invention include, but are not limited to, fatty acids such as caprylic acid ($CH_3(CH_2)_6COOH$), hydrated salts such as Glauber's salt, manganese nitrate hexahydrate ($Mn(NO_3)_2 \cdot 6H_2O$), manganese nitrate tetrahydrate ($Mn(NO_3)_2 \cdot 4H_2O$) or zinc nitrate hexahydrate ($Zn_2(NO_3)_2 \cdot 6H_2O$). Other phase change materials may also be used in the present invention.

Step (S200) of pre-treating the phase change material is a step of treating the phase change material such that it can be easily inserted into activated carbon, which is the porous material medium. This step comprises reducing the viscosity of the phase change material. A method for reducing the viscosity of the phase change material includes heating the phase change material to a temperature equal to or higher than the melting point thereof.

Step (S300) of inserting the pretreated phase change material into activated carbon comprises mixing the heated phase change material with activated carbon and then aging the mixture at a temperature equal to or higher than the melting point of the phase transition material for a predetermined time (about 24 hours) such that that the phase change material is introduced into the micropores of activated carbon by a capillary action.

Step (S300) of inserting the phase change material further comprises maintaining the mixture in a pressure tank at a predetermined pressure (e.g., 1 atm or higher) for a predetermined time (about 24 hours) in order to promote diffusion of the phase change material into the micropores of the activated aged carbon.

Step (S400) is a step of filtering the activated carbon filled with the phase change material to recover the phase change material remaining after the insertion step.

Step (S500) is a step of washing the filtered activated carbon with hot water having a temperature equal to or higher than the melting point of the phase change material to thereby remove the phase change material from the surface of the activated carbon.

Meanwhile, the inventive porous material having micropores capable of storing and releasing heat by phase change comprises: a porous material medium comprising activated carbon or silica gel; and a phase change material inserted into the porous material medium.

Herein, the porous material medium before being filled with the phase change material is a porous material medium subjected to a drying and vacuum treatment to remove impurities from the micropores thereof. For example, the porous material medium is a porous material medium obtained by heating a porous material medium to 200° C. in a dryer or the like and then applying a vacuum thereto, thereby removing impurities from the micropores thereof.

Also, the phase change material which is filled in the pretreated porous material medium is a phase change material pretreated so as to be easily filled into the pretreated porous material medium. That is, the phase change material is a phase change material pretreated by heating to a temperature equal to or higher than the melting point thereof.

Examples of the phase change material that is used in the porous material include, but are not limited to, caprylic acid ($CH_3(CH_2)_6COOH$), Glauber's salt, manganese nitrate hexahydrate, $Mn(NO_3)_2 \cdot 6H_2O$), manganese nitrate tetrahydrate ($Mn(NO_3)_2 \cdot 4H_2O$), and zinc nitrate hexahydrate ($Zn_2(NO_3)_2 \cdot 6H_2O$).

Meanwhile, the porous material having micropores capable of storing and releasing heat by phase change is obtained by the process comprising the following steps of:

mixing the heated phase change material with activated carbon, and aging the mixture at a temperature equal to or higher than the melting point of the phase change material for a predetermined time (about 24 hours) such that the phase change material is introduced into the micropores of the activated carbon by a capillary action;

maintaining the aged mixture in a pressure tank at a pressure of 1 atm or higher for a predetermined time (about 24 hours) to promote the diffusion of the phase change material into the activated carbon;

filtering the activated carbon filled with the phase change material to remove the phase change material remaining after filling; and washing the filtered material with hot water having a temperature equal to or higher than the melting point of the phase change material to remove the phase change material from the surface of the activated carbon.

The inventive porous material having micropores capable of storing and releasing heat by phase change overcomes the shortcomings of the conventional polymer material encapsulating the phase change material and has a structure in which the phase change material is inserted into the micropores of the porous material medium (such as activated carbon or silica) having a pore size of 500-20 Å or less such that phase change occurs in the micropores.

Activated carbon and silica, which are porous material mediums, have a specific area of 1,000 $m^2/g$ or more, and the phase change material is diffused into the micropores of the porous material medium by a capillary action and adsorbed thereto. Once the phase change material is diffused and adsorbed into the micropores of the activated carbon, it is difficult to extract it from the micropores. In order to remove the phase change material from the micropores of activated carbon, the activated carbon containing the phase change material should be maintained at a temperature of 200° C. or higher for 6 hours or more.

Thus, once the phase change material is inserted into the micropores of the porous material medium, the micropores of the porous material medium serve as a storage tank for the phase change material so that they absorb and store heat in a heating process and release heat in a cooling process.

In addition, the portions other than micropores of the activated carbon serve as a supporter, thus eliminating the need for an encapsulation process for storing the phase change material.

Figure 3:
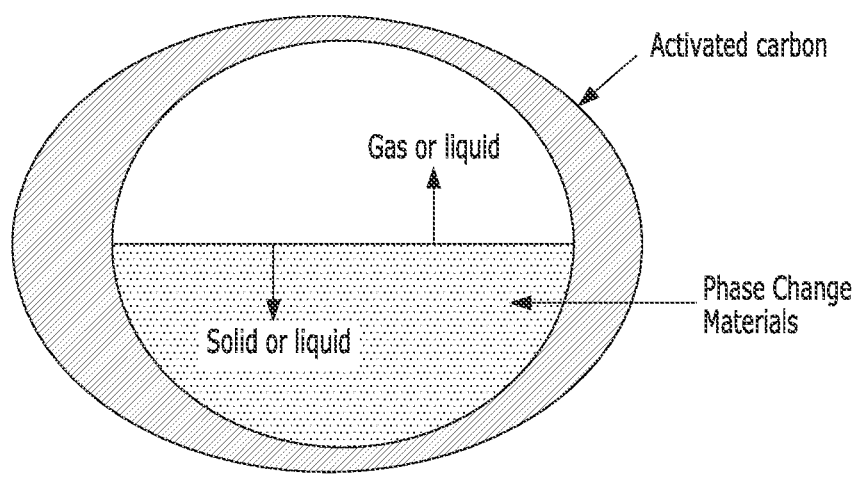
FIG. 3 is a conceptual diagram showing a liquid-to-solid phase change (heat release) or a liquid-to-solid phase change (heat absorption or storage), which occurs in the phase change material-micropores of a porous material capable of storing and releasing heat by phase change according to the present invention.
Figure 4:
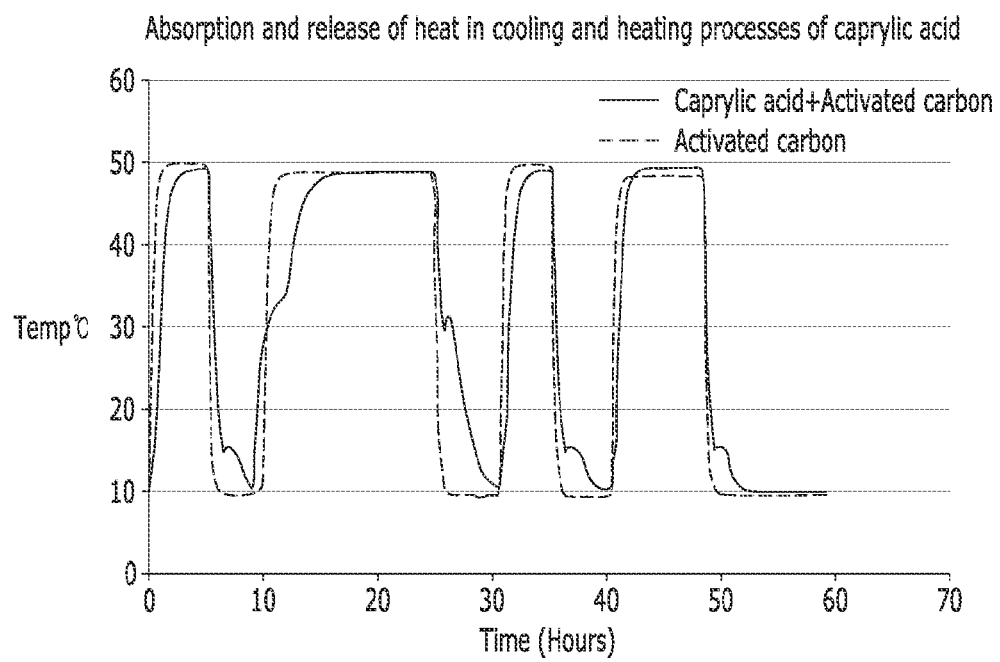
FIG. 4 is a graph showing the results of measuring heat absorption and release in the cooling and heating processes of caprylic acid ($CH_3(CH_2)_6COOH$), which was used as a phase change material in a test example of the present invention.
Figure 5:
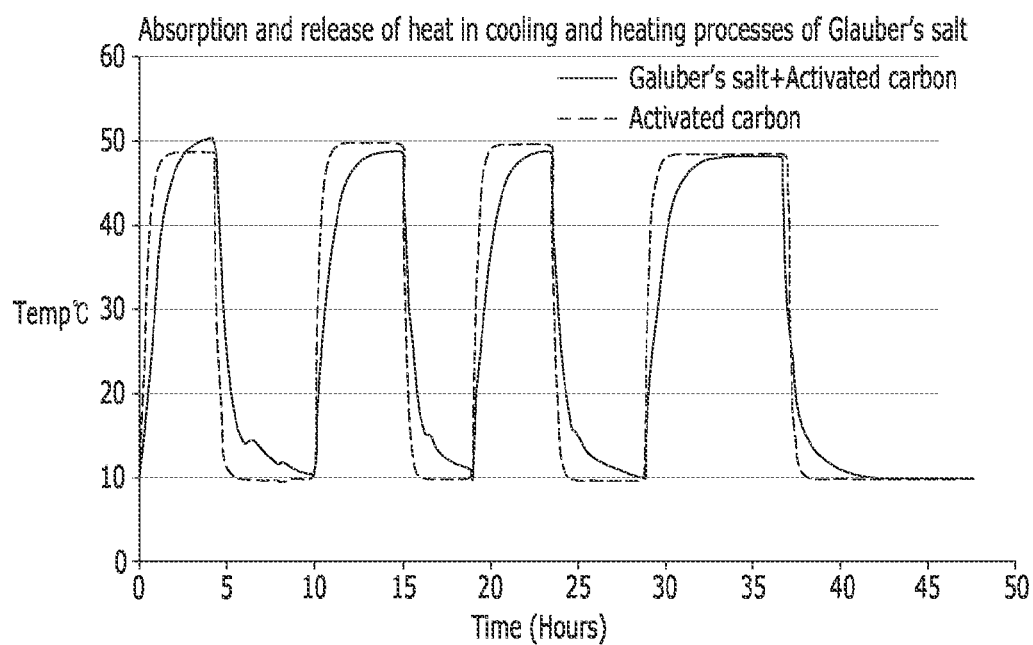
FIG. 5 is a graph showing the results of measuring heat absorption and release in the cooling and heating processes of Glauber's salt, which was used as a phase change material in a test example of the present invention.
Figure 6:
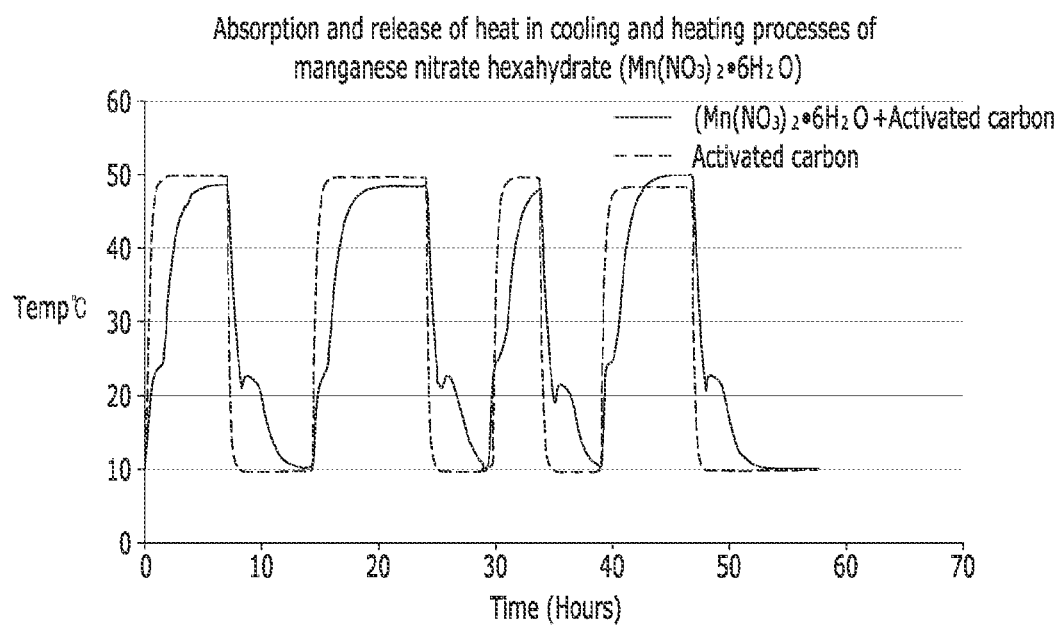
FIG. 6 is a graph showing the results of measuring heat absorption and release in the cooling and heating processes of manganese nitrate hexahydrate ($Mn(NO_3)_2.6H_2O$), which was used as a phase change material in a test example of the present invention.
Figure 7:
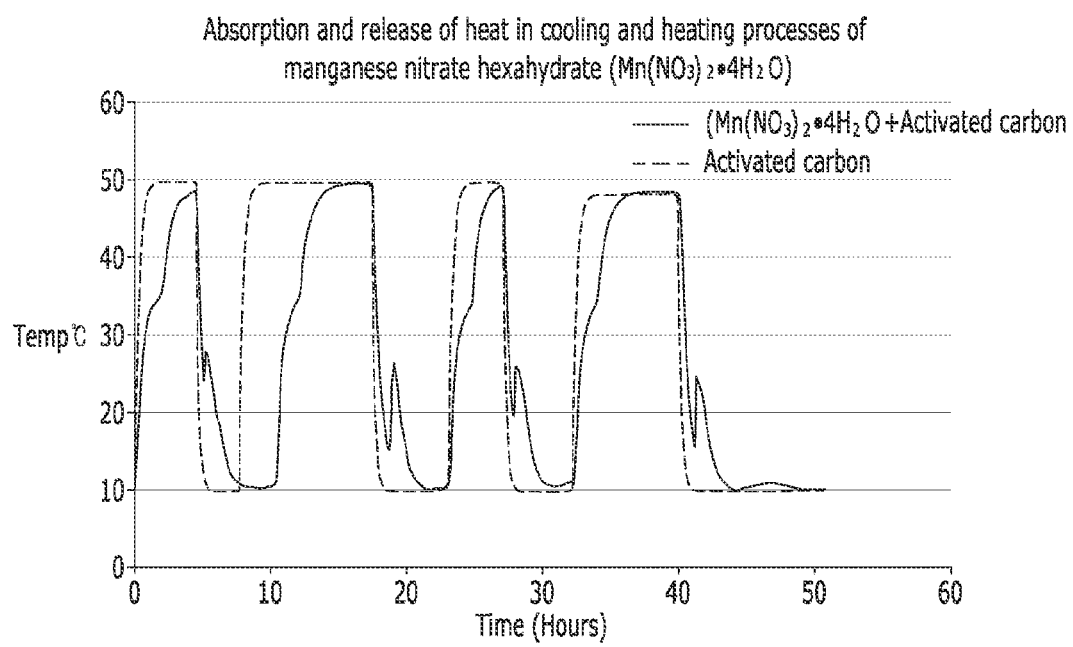
FIG. 7 is a graph showing the results of measuring heat absorption and release in the cooling and heating processes of manganese nitrate tetrahydrate ($Mn(NO_3)_2.4H_2O$), which was used as a phase change material in a test example of the present invention.
Figure 8:
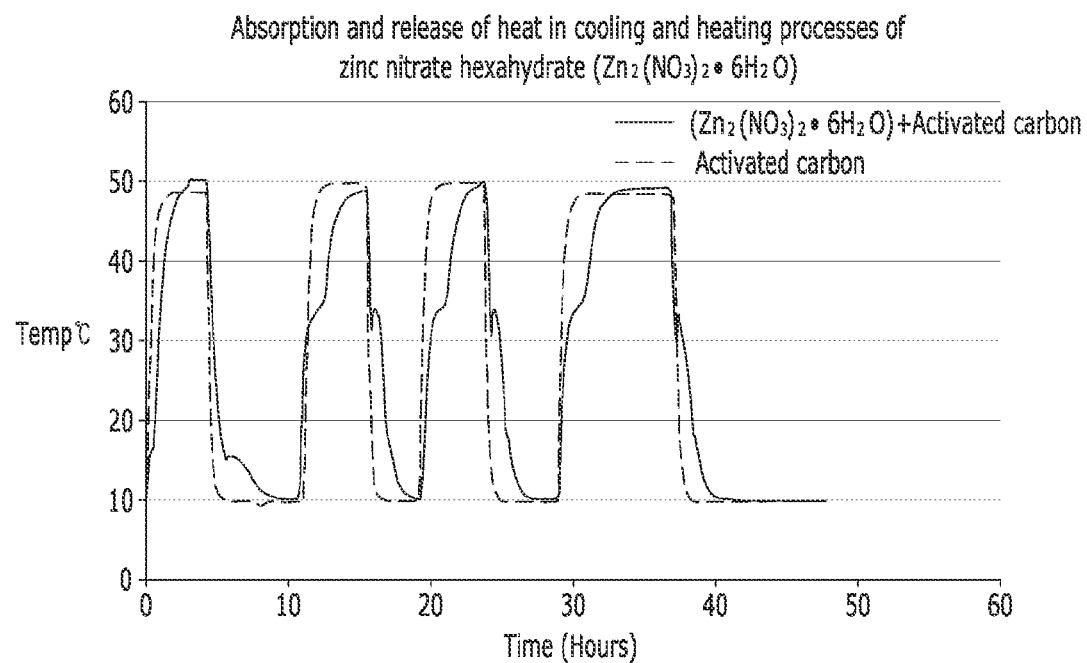
FIG. 8 is a graph showing the results of measuring heat absorption and release in the cooling and heating processes of zinc nitrate hexahydrate ($Zn_2(NO_3)_2.6H_2O$), which was used as a phase change material in a test example of the present invention.

As shown in FIG. 3, according to the present invention, the phase change material is introduced into the micropores of the porous material medium (activated or silica gel) by physical diffusion, and thus the inside of the micropores is not fully filled and space remains in a portion thereof. Thus, even when a phase change occurs in the micropores, the walls of the activated carbon are not broken or cracked.

In other words, in the present invention, the micropores of activated carbon serve as a storage tank for the phase change material, and the activated carbon itself serves as support for preventing leakage of the phase change material.

EXAMPLES

The present inventor performed a test in order to compare the absorption and release of heat as a function of temperature between activated carbon and an activated carbon containing a phase change material inserted into the micropores thereof.

The following phase change materials were used in the test: caprylic acid ($CH_3(CH_2)_6COOH$) which is a fatty acid; and Glauber's salt, manganese nitrate hexahydrate, $Mn(NO_3)_2.6H_2O$), manganese nitrate tetrahydrate, $Mn(NO_3)_2.4H_2O$) and zinc nitrate hexahydrate ($Zn_2(NO_3)_2.6H_2O$), which are hydrated salts. It is to be understood that other phase change materials could be used.

FIGS. 4 to 8 are graphs showing the results of measuring the absorption and release of heat in the cooling and heating processes of caprylic acid ($CH_3(CH_2)_6COOH$), Glauber's salt, manganese nitrate hexahydrate, $Mn(NO_3)_2.6H_2O$), manganese nitrate tetrahydrate, $Mn(NO_3)_2.4H_2O$) and zinc nitrate hexahydrate ($Zn_2(NO_3)_2.6H_2O$, which were used as phase change materials.

In the test for measuring the heat absorption and release of the phase change material, when the phase change material was cooled to 10° C. and the ambient temperature was maintained at 50° C., the change in the temperature of the phase change material in the heating process (heat absorption) was measured, and when the phase change material was heated to 50° C. and the ambient temperature was maintained at 10° C., the change in the temperature of the phase change material in the cooling process (heat release) was measured.

As can be seen in each of FIGS. 4 to 8, in the case of activated carbon alone, the heating rate was very high when the ambient temperature is 50° C., and the cooling rate was very high when the ambient temperature is as low as 10° C. This suggests that activated carbon has a very high heat transfer rate. On the other hand, in the case in which the phase change material was inserted into the micropores of the activated carbon, the heating rate in the heating process (heat absorption or storage) was very low, and the cooling rate in the cooling process (heat release) was also very low. In addition, even when the same test was repeated, similar results were observed.

As a result, it can be seen that, when the micropores of activated carbon are used as a storage tank for storing the phase change material, the need for an encapsulation process for encapsulating the phase change material according to conventional methods found in prior art is eliminated.

As described above, according to the present invention, when a phase change material is inserted into the micropores of a porous material medium such as activated carbon or silica gel, the micropores absorb and store heat in a heating process and release heat in a cooling process. Herein, the porous material medium itself serves as support for storing the phase change material, thus eliminating the need for an encapsulation process for storing the phase change material.

In addition, in the prior art, there was a problem in that the thin film encapsulating the phase change material is torn or cracked by external physical impact. However, according to the present invention, the phase change material is inserted into the porous material medium, and thus the porous material medium itself serves as support and is not damaged by external physical impact.

Furthermore, the energy storage medium of the present invention can be prepared in an environmentally-friendly manner without using volatile materials, and can be prepared in a more cost-effective manner as compared to the prior art, and also has high heat conductivity.

As described above, a porous material having micropores capable of storing and releasing heat by phase change according to the present invention and a preparation method thereof have the following effects.

First, the porous material having micropores capable of storing and releasing heat by phase change according to the present invention can be prepared in an environmentally-friendly manner without using volatile materials and can be prepared in a more cost-effective manner as compared to the prior art.

Second, the porous material medium itself receiving the phase change material serves as support so as to eliminate the need for an encapsulation process. Thus, the porous material having micropores capable of storing and releasing heat by phase change according to the present invention is prepared by a simple and easy method, and the phase change material stored therein does not leak even when external pressure or friction is applied.

Third, the phase change material can sufficiently perform heat absorption and release and has high heat conductivity.

Although the preferred embodiments of the present invention have been described for illustrative purposes, those skilled in the art will appreciate that various modifications, additions and substitutions are possible, without departing from the scope and spirit of the invention as disclosed in the accompanying claims.

What is claimed is:

1. A method for preparing a porous material having micropores capable of storing and releasing heat by phase change, the method comprising the steps of:

pre-treating a porous material medium to remove impurities from the micropores of the porous material medium, thereby opening the micropores;
pre-treating a phase change material to make it possible to insert the phase change material into the micropores of the porous material medium;
inserting the pretreated phase change material into the pretreated porous material medium;
filtering the porous material medium filled with the phase change material to remove the phase change material remaining after the insertion step; and
washing the filtered material at a temperature equal or higher than the melting point of the phase change material.

2. The method of claim 1, wherein the porous material medium is activated carbon or silica gel.

3. The method of claim 1, wherein the phase change material includes any one of caprylic acid ($CH_3(CH_2)_6COOH$), Glauber's salt, manganese nitrate hexahydrate ($Mn(NO_3)_2 \cdot 6H_2O$), manganese nitrate tetrahydrate ($Mn(NO_3)_2 \cdot 4H_2O$), and zinc nitrate hexahydrate ($Zn_2(NO_3)_2 \cdot 6H_2O$).

4. The method of claim 1, wherein the step of pre-treating the porous material medium comprises drying and vacuum-treating the porous material medium.

5. The method of claim 1, wherein the step of pre-treating the porous material medium comprises heating the porous material medium to 200° C., and then applying a vacuum thereto.

6. The method of claim 1, wherein the step of pre-treating the phase change material comprises reducing the viscosity of the phase change material.

7. The method of claim 1, wherein the step of pre-treating the phase change material comprises heating the phase change material to a temperature equal to or higher than the melting point thereof.

8. The method of claim 7, wherein the step of inserting the pretreated phase change material comprises mixing the pretreated phase change material with the pretreated porous material medium and aging the mixture at a temperature equal to or higher than the melting point of the phase change material for a predetermined time.

9. The method of claim 1, wherein the step of inserting the pretreated phase change material further comprises diffusing the phase change material into the micropores of the porous material medium.

10. The method of claim 9, wherein diffusing the phase change material is performed by maintaining the mixture in a pressure tank at a pressure equal to or higher than 1 atm for 24 hours.

11. The method of claim 1, wherein the step of washing the filtered material is performed by washing the phase change material with hot water.

12. The method of claim 2, wherein the phase change material includes any one of caprylic acid ($CH_3(CH_2)_6COOH$), Glauber's salt, manganese nitrate hexahydrate ($Mn(NO_3)_2 \cdot 6H_2O$), manganese nitrate tetrahydrate ($Mn(NO_3)_2 \cdot 4H_2O$), and zinc nitrate hexahydrate ($Zn_2(NO_3)_2 \cdot 6H_2O$).

13. The method of claim 4, wherein the step of pre-treating the porous material medium comprises heating the porous material medium to 200° C., and then applying a vacuum thereto.

14. The method of claim 6, wherein the step of pre-treating the phase change material comprises heating the phase change material to a temperature equal to or higher than the melting point thereof.

15. The method of claim 8, wherein the step of inserting the pretreated phase change material further comprises diffusing the phase change material into the micropores of the porous material medium.

* * * * *